(12) United States Patent
Zou et al.

(10) Patent No.: US 12,637,899 B2
(45) Date of Patent: May 26, 2026

(54) LIGHT-TRANSMITTING MODULE AND RECREATIONAL VEHICLE WINDOW COMPRISING THE SAME

(71) Applicant: Longkou Yongan Vehicle Window Co., Ltd., Yantai (CN)

(72) Inventors: Jixin Zou, Yantai (CN); Yusheng Li, Yantai (CN)

(73) Assignee: Longkou Yongan Vechile Window CO., Ltd, Yantai (CN)

( * ) Notice: Subject to any disclaimer, the term of this patent is extended or adjusted under 35 U.S.C. 154(b) by 196 days.

(21) Appl. No.: 18/505,045

(22) Filed: Nov. 8, 2023

(65) Prior Publication Data

US 2025/0034933 A1      Jan. 30, 2025

(30) Foreign Application Priority Data

Jul. 24, 2023      (CN) .......................... 202321946351.2

(51) Int. Cl.
| | |
|---|---|
| *B32B 3/10* | (2006.01) |
| *B60J 1/00* | (2006.01) |
| *E06B 1/12* | (2006.01) |
| *E06B 3/67* | (2006.01) |
| *E06B 3/677* | (2006.01) |

(52) U.S. Cl.
CPC ............. *E06B 3/6715* (2013.01); *B60J 1/001* (2013.01); *E06B 1/12* (2013.01); *E06B 3/677* (2013.01)

(58) Field of Classification Search
None
See application file for complete search history.

(56) References Cited

U.S. PATENT DOCUMENTS

2008/0020154 A1* 1/2008 Landon .................. C03C 27/10
428/34

FOREIGN PATENT DOCUMENTS

| | | | | | |
|---|---|---|---|---|---|
| CN | 107645989 A | * | 1/2018 | ............. | B60Q 3/208 |
| CN | 113719220 A | * | 11/2021 | ............... | E06B 5/18 |
| WO | WO-2021067505 A1 | * | 4/2021 | ........... | G09F 19/227 |

OTHER PUBLICATIONS

Machine translation of CN-113719220-A (Year: 2021).*
Machine translation of CN-107645989-A (Year: 2018).*

* cited by examiner

*Primary Examiner* — Christopher M Polley

(57) ABSTRACT

A light-transmitting module comprises a tempered glass plate located on an outer layer and an acrylic glass plate located on an inner layer and having the same shape as the tempered glass plate on the outer layer, annular spacer strips are close to the inner edges of the tempered glass plate and the acrylic glass plate and are sealed together with them by using a sealant, closed heat-insulating cavities are formed between the tempered glass plate and the acrylic glass plate, in a space defined by the spacer strips; the outer layer of the present invention uses a tempered glass plate for enhancing the wear resistance and permeability of the outer layer, and the inner layer uses an acrylic glass plate such that the process of glass molding is improved.

5 Claims, 4 Drawing Sheets

LIGHT-TRANSMITTING MODULE AND RECREATIONAL VEHICLE WINDOW COMPRISING THE SAME

TECHNICAL FIELD

This invention generally relates to the technical field of recreational vehicle windows, and more particularly, to a light-transmitting module and a recreational vehicle window comprising the same.

BACKGROUND

Along with the improvement of people's living standards, new life styles have begun to appear. A recreational vehicle serves as both a house and a car, not only being able to move at any time, but also being able to park in a natural environment far from the city. As a result, recreational vehicles are extensively used in people's daily lives, and are therefore favored by many people who enjoy traveling.

Windows of conventional recreational vehicles typically comprise a double-layer acrylic glass that is rotatably mounted on a window frame in an openable and closable manner. However, acrylic glass on an outer layer is easily softened in high-temperature environment and becomes brittle in a low-temperature environment. Moreover, under the influence of wind, sand and sunlight, scratches occur on the outer-layer acrylic glass, and the acrylic glass is prone yellowing with age. Meanwhile, as an important component of the recreational vehicle, functions such as appealing look, heat insulation and wear resistance are necessary. Therefore, it is urgent for those skilled in the art to develop a novel recreational vehicle window.

SUMMARY

The purpose of the present invention is to provide a light-transmitting module and a recreational vehicle window comprising the same. The present invention is capable of resisting the influence of air pressure, possesses functions including appealing look, heat insulation and wear resistance, and achieves high practicability.

To achieve the above purpose, the present invention adopts the following technical solution: a light-transmitting module comprises a tempered glass plate located on an outer layer and an acrylic glass plate located on an inner layer and having the same shape as the tempered glass plate on the outer layer, wherein annular spacer strips are close to the inner edges of the tempered glass plate and the acrylic glass plate and are sealed together with them by using a sealant, wherein closed heat-insulating cavities are formed between the tempered glass plate and the acrylic glass plate, as well as in a space defined by the spacer strips.

In another embodiment of the present invention, the light-transmitting module comprises a double-layer glass and an invisible hinge. From top to bottom, the invisible hinge comprises a rotating portion, a connecting portion and an inserting portion that are sequentially integrated. The connecting portion is connected to the top end of the double-layer glass in a sealed manner. The inserting portion is inserted between the tempered glass plate and the acrylic glass plate and is fixed therein by using a sealant. The inserting portion is arranged outside the spacer strip. The rotating portion is a hook-shaped portion with an arc surface, the cross section of the connecting portion is L-shaped, and the cross section of the inserting portion is groove-shaped. An open end of the groove is attached to the tempered glass plate.

In another embodiment of the present invention, the light-transmitting module further comprises a waterproof air-permeable valve, and the waterproof air-permeable valve is arranged on the acrylic glass plate in a space defined by the spacer strips.

In another embodiment of the present invention, the heat-insulating cavity is filled with an inert gas.

In another embodiment of the present invention, the acrylic glass plate within a range defined by the spacer strips protrudes inward to form an additional heat-insulating cavity.

In another embodiment of the present invention, the additional heat-insulating cavity is filled with an inert gas.

A recreational vehicle window comprises a broken bridge aluminum window frame and a light-transmitting module. The rotating portion is rotatably embedded inside the top end of the broken bridge aluminum window frame. Supporting rods are hinged to the inner sides of two ends of the broken bridge aluminum window frame, and locking assemblies A are hinged to push rods of the supporting rods. The bottom of the light-transmitting module is provided with a locking assembly B. The locking assembly A and the locking assembly B are both used for locking at the inner sides of the broken bridge aluminum window frame when the light-transmitting module is closed.

In another embodiment of the present invention, the locking assembly A and the locking assembly B respectively comprises a base, a locking handle and a latch fastener. The base is bolted on the acrylic glass plate in a sealed manner. The locking handle is hinged to the top end of the base, the locking handle is rotatably embedded in the latch fastener for being locked therein, the locking fastener is bolted to an inner side of the broken bridge aluminum window frame, and the push rod of the support rod is hinged to a corresponding base. A sealing ring is arranged on an inner wall of the broken bridge aluminum window frame for abutting against the acrylic glass plate in a sealed manner.

In another embodiment of the present invention, the top portion of the broken bridge aluminum window frame is bolted to a connecting piece, and the broken bridge aluminum window frame is mounted on the recreational vehicle by using the connecting piece.

In another embodiment of the present invention, the broken bridge aluminum window frame and the light-transmitting module are configured to be a rectangle having right-angled or rounded corners.

Compared with the prior art, the present invention has the following advantages:

1. The outer layer of the present invention adopts a tempered glass plate, which enhances the wear resistance and permeability of the outer layer, protects the outer layer against softening in a high temperature environment and embrittlement in a low temperature environment: the inner layer adopts an acrylic glass plate, which lowers the difficulty of processing, reduces cost, and improves safety for drivers and passengers;

2. The tempered glass plate and the acrylic glass plate are partitioned by the spacer strips, and the spacer strips, the acrylic glass plate and the tempered glass plate form a sealed cavity, achieving high heat-insulating performance while avoiding the phenomenon of condensation on the surface of the glass caused by a large indoor and outdoor temperature difference;

3. The additional heat-insulating cavity is filled with an inert gas such as argon, which facilitates internal and external pressure balance and avoids the deformation caused by the temperature difference;

4. The waterproof air-permeable valve also facilitates internal and external pressure balance and avoids the deformation caused by the temperature difference.

In Figures: 1—Broken Bridge Aluminum Window Frame, 2—Light-transmitting Module, 3—Supporting Rod, 4—Locking Assembly A, 5—Locking Assembly B, 6—Connecting Piece, 11—Sealing Ring, 21—Tempered Glass Plate, 22—Spacer Strip, 23—Acrylic Glass Plate, 24—Waterproof Air-permeable Valve, 25—Invisible Hinge, 26—Groove, 27—Sealant, 41—Base, 42—Locking Handle, 43—Latch Fastener, 251—Connecting Portion, 252—Rotating Portion, 253—Inserting Portion.

DETAILED DESCRIPTION

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In the description of the present invention, it should be understood that the orientations or positions indicated by the terms "central", "longitudinal", "transverse", "upper", "lower", "front", "rear", "left", "right", "vertical", "horizontal", "top", "bottom", "inner" and "outer" are based on the orientations or positions shown in the figures. They are merely for the convenience of describing and simplifying the description of the present invention, but not indicating or implying that the equipment or element referred to must have a specific orientation, or be constructed and operated in a specific orientation. Thus, they cannot be understood as a limitation to the present invention.

Embodiment 1

Figure 1:
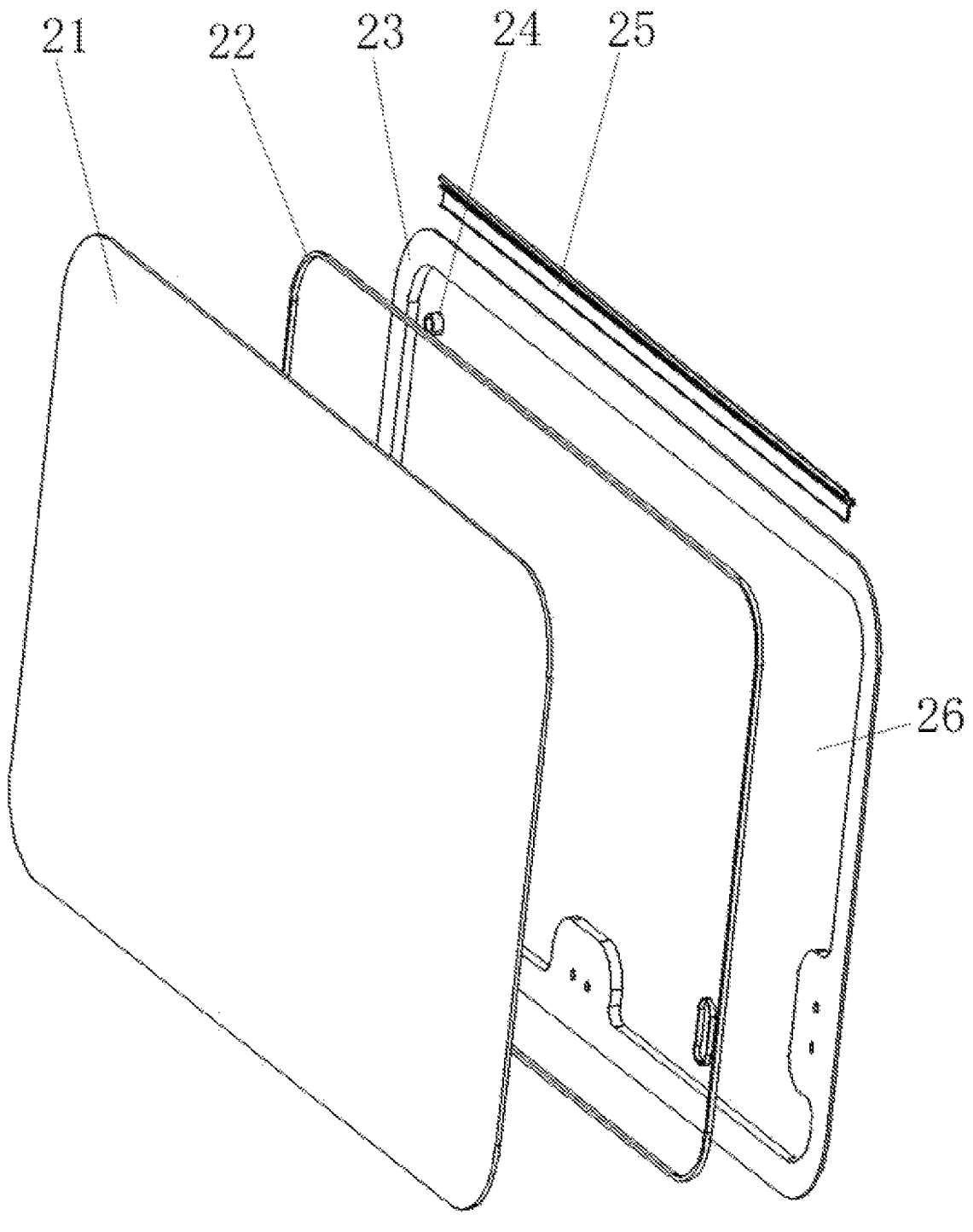
FIG. 1 is a schematic diagram illustrating an exemplary structure of the light-transmitting module of the present invention.
Figure 2:
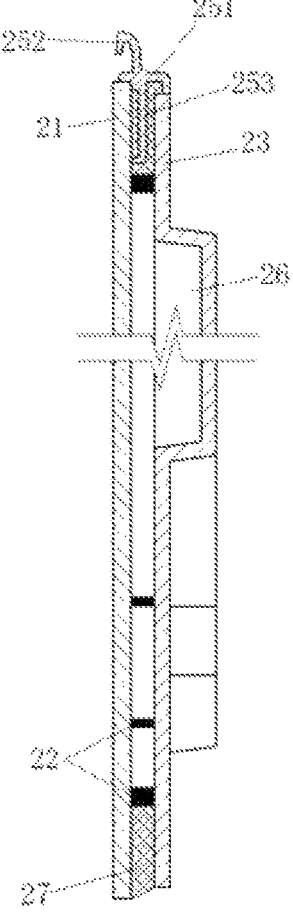
FIG. 2 is a schematic diagram illustrating a sectional view of FIG. 1.
Figure 3:
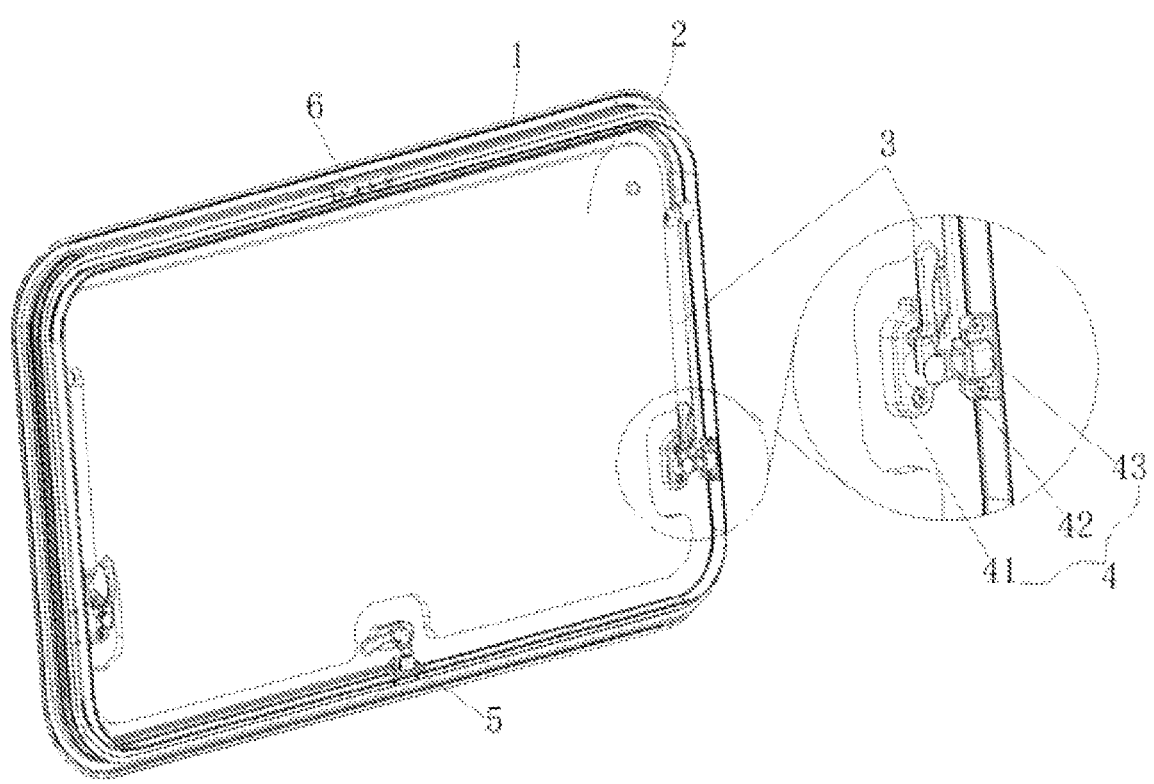
FIG. 3 is a schematic diagram illustrating an exemplary structure of the recreational vehicle window of the present invention.
Figure 4:
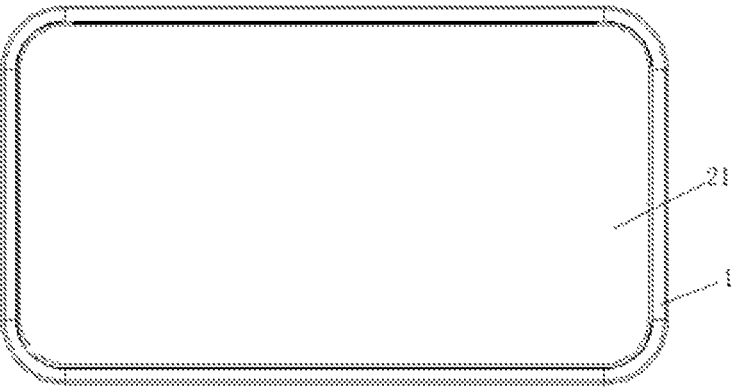
FIG. 4 is a schematic diagram illustrating a front view of FIG. 3.
Figure 5:
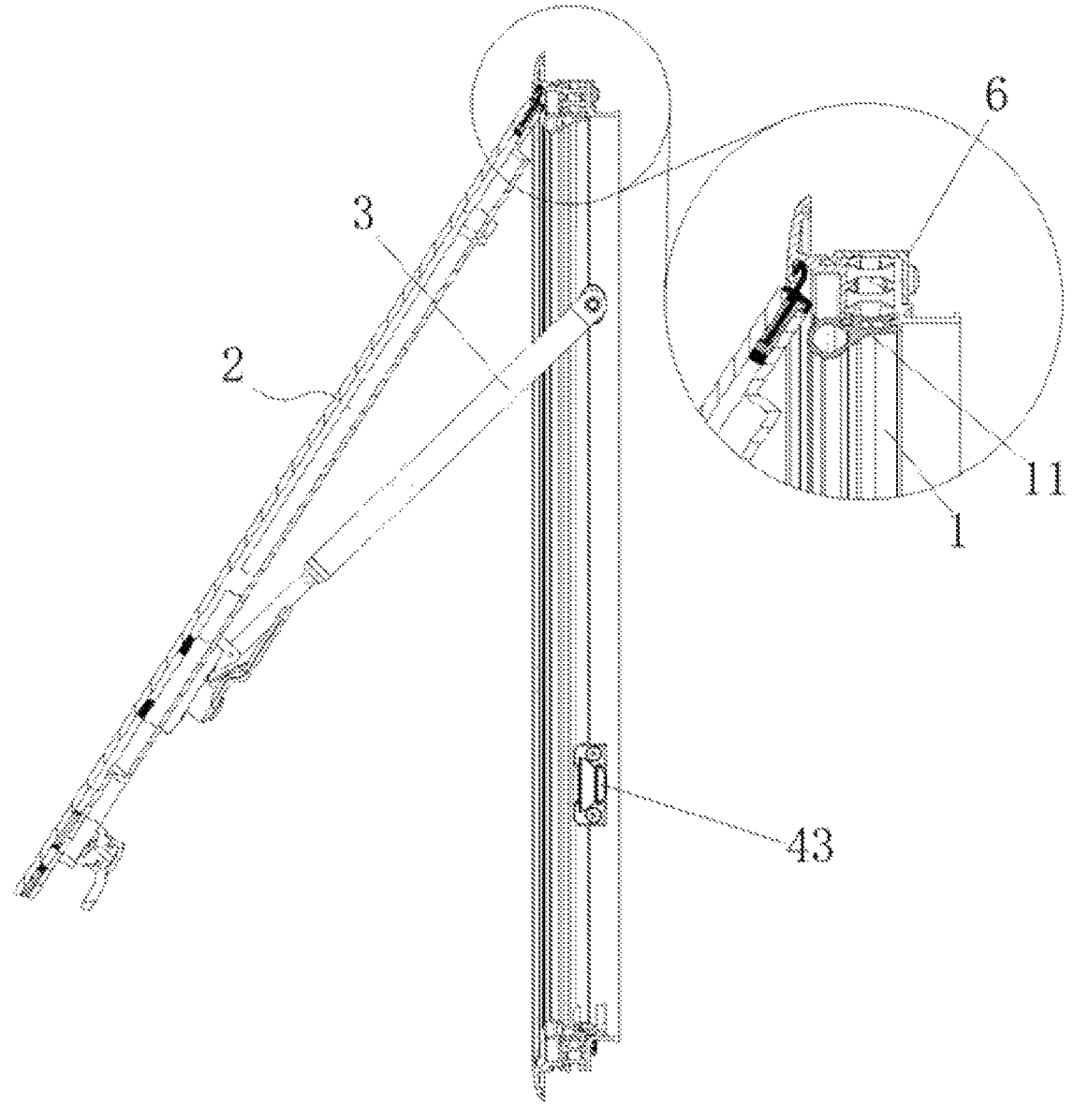
FIG. 5 is a schematic diagram illustrating a use state of FIG. 3.

As shown in FIGS. 1-5, the present invention provides a recreational vehicle window. The recreational vehicle window of the present invention comprises a broken bridge aluminum window frame 1 and a light-transmitting module 2, wherein supporting rods 3 are hinged to the inner sides of two ends of the broken bridge aluminum window frame 1, and locking assemblies A4 are hinged to push rods of the supporting rods 3. The bottom of the light-transmitting module 2 is provided with a locking assembly B5. The locking assembly A4 and the locking assembly B5 are both used for locking the inner sides of the broken bridge aluminum window frame 1 when the light-transmitting module 2 is closed.

In embodiment 1 of the present invention, the light-transmitting module 2 comprises a double-layer glass and an invisible hinge 25. From exterior to interior, the double-layer glass sequentially comprises a tempered glass plate 21, a spacer strip 22 and an acrylic glass plate 23 that are connected in a sealed manner. The inner side of the spacer strips 22 define a sealed cavity. From top to bottom, the invisible hinge 25 comprises a rotating portion 252, a connecting portion 251 and an inserting portion 253 that are sequentially integrated. The connecting portion 251 is connected to the top end of the double-layer glass in a sealed manner. The inserting portion 253 is inserted into the double-layer glass and is fixed therein by using a sealant 27. The inserting portion 253 is arranged outside the spacer strip 22. Correspondingly, the rotating portion 252 is rotatably embedded inside the top end of the broken bridge aluminum window frame 1. The tempered glass plate 21 has good wear resistance, capable of resisting damages caused by wind, sand, cleaning and wiping.

To make the heat insulation performance of the light-transmitting module 2 higher, the acrylic glass plate 23 within the range defined by the spacer strips 22 protrudes inward to form an additional heat-insulating cavity 26. An inert gas such as argon may also be filled in the additional heat-insulating cavity 26, and a waterproof air-permeable valve 24 is arranged on the acrylic glass plate 23 corresponding to the additional heat-insulating cavity 26. The inert gas is capable of improving the blocked effect of thermal energy while balancing internal and external air pressures. The waterproof air-permeable valve 24 is capable of preventing external water molecules from entering the heat-insulating cavity while balancing the air pressure inside and outside the heat-insulating cavity, thereby avoiding the glass deformation caused by the influence of air pressure.

The rotating portion 252 may be a hook-shaped portion with an arc surface, the cross section of the connecting portion 251 may be L-shaped, and the cross section of the inserting portion 253 may be groove-shaped. An open end of the groove is attached to the tempered glass plate 21.

In this embodiment, the locking assembly A4 and the locking assembly B5 respectively comprises a base 41, a locking handle 42 and a latch fastener 43. The base 41 is bolted on the acrylic glass plate 23 in a sealed manner. The locking handle 42 is hinged to the top end of the base 41, the locking handle 42 is rotatably embedded in the latch fastener 43 for being locked therein, the locking fastener 43 is bolted to an inner side of the broken bridge aluminum window frame 1, and the push rod of the support rod 3 is hinged to a corresponding base 41.

Preferably, the latch fastener 43 is provided with a slot, and the locking handle 42 is embedded in the slot for being locked therein, which are briefly described herein.

When the light-transmitting module 2 is closed, to prevent rainwater from entering the broken bridge aluminum window frame 1, a sealing ring 11 is arranged on an inner wall of the broken bridge aluminum window frame 1. In addition, the sealing ring 11 is used to abut against the acrylic glass plate 23 for achieving a sealing effect.

To facilitate the installation and use of the present invention, the top portion of the broken bridge aluminum window frame 1 is bolted to a connecting piece 6. The connecting piece 6 is used for connecting the broken bridge aluminum window frame 1.

In addition, the broken bridge aluminum window frame 1 and the tempered glass plate 21 may be configured to be rectangular, and the corresponding four corners may be right-angled or rounded. The shape of the broken bridge aluminum window frame 1 and the tempered glass plate 21 may be selected and designed according to actual requirements, which is briefly described herein.

During use, the locking handles 42 on the locking assembly A4 and the locking assembly B5 are unlocked first, then the light-transmitting module 2 is pushed. At this point, under the interaction between the invisible hinge 25 and the supporting rod 3, the light-transmitting module 2 is opened outwards, thereby enabling the tempered glass plate 21 to face the outside.

The acrylic glass plate 23 may be made of PMMA acrylic glass, and the spacer strip 22 may adopt a moisture-proof spacer strip. By means of the moisture-proof spacer strip 22, the argon and the waterproof air-permeable valve 24, the phenomenon of condensation on the surface of the glass caused by a large indoor and outdoor temperature difference is effectively avoided, so that the practicability of the present invention is significantly improved.

The structure of the supporting rod 3 may be various, which is briefly described herein.

The present invention may be described in other specific forms without departing from the spirit or main features of the present invention. Therefore, regardless of viewing it from any angle, the aforesaid embodiment of the present invention should merely be considered as a description of the present invention instead of a limitation to the present invention. The scope of the present invention is defined by the claims, while the aforesaid description does not clearly show the scope of the present invention. Therefore, any modifications within the meaning and scope equivalent to that defined by the claims shall fall into the scope defined by the claims of the present invention.

What is claimed is:

1. A light-transmitting module, comprising:
   a tempered glass plate (21) located on an outer layer, and
   an acrylic glass plate (23) located on an inner layer and having the same shape as the tempered glass plate (21) on the outer layer, wherein annular spacer strips (22), the tempered glass plate (21), the acrylic glass plate (23) and are sealed together using a sealant (27), wherein closed heat-insulating cavities are formed between the tempered glass plate (21) and the acrylic glass plate (23), in a space defined by the spacer strips (22);
   wherein the light-transmitting module further comprises a waterproof air-permeable valve (24), and the waterproof air-permeable valve (24) is arranged on the acrylic glass plate (23) in a space defined by the spacer strips (22).

2. The light-transmitting module of claim 1, wherein the light-transmitting module (2) further comprises a double-layer glass and an invisible hinge (25), wherein the invisible hinge (25) comprises:
   a rotating portion (252), a connecting portion (251) and an inserting portion (253) that are sequentially integrated, wherein the connecting portion (251) is connected to top end of the double-layer glass in a sealed manner, wherein the inserting portion (253) is inserted between the tempered glass plate (21) and the acrylic glass plate (23) and is fixed therein by using a sealant (27), wherein the inserting portion (253) is arranged outside the spacer strip (22), wherein the rotating portion (252) is a hook-shaped portion with an arc surface, the cross section of the connecting portion (251) is L-shaped, and the cross section of the inserting portion (253) is groove-shaped, wherein an open end of the groove is attached to the tempered glass plate (21).

3. The light-transmitting module of claim 1, wherein the heat-insulating cavity is filled with an inert gas.

4. The light-transmitting module of claim 1, wherein the acrylic glass plate (23) within a range defined by the spacer strips (22) protrudes inward to form an additional heat-insulating cavity (26).

5. The light-transmitting module of claim 4, wherein the additional heat-insulating cavity (26) is filled with an inert gas.

* * * * *